UNITED STATES PATENT OFFICE.

JOSEPH TURNER AND HARRY DEAN, OF HUDDERSFIELD, ENGLAND.

MANUFACTURE OF BLACK COLORING-MATTERS.

1,014,984.    Specification of Letters Patent.    Patented Jan. 16, 1912.

No Drawing.    Application filed April 24, 1911. Serial No. 622,911.

*To all whom it may concern:*

Be it known that we, JOSEPH TURNER and HARRY DEAN, subjects of King George V of Great Britain, residing at Huddersfield, in the county of York, England, have invented certain new and useful Improvements in the Manufacture of Black Coloring-Matters, of which the following is a specification.

Our invention relates to the production of black coloring matters for dyeing cotton or vegetable fibers directly deep black shades.

In our experiments, we have found that chlor-meta-phenylene-diamin is very suitable for use as an end component in the manufacture of black dyestuffs which dye cotton or vegetable fibers directly and possess great affinity therefor. For instance, we take a para-mono-amido-azo compound such as para-amido-benzene-azo-alpha-naphthylamin-sulfonic-acid prepared say by the action of diazotized para-amido-acetanilid upon alpha-naphthylamin-sulfonic-acid-1-6 or 1-7 (Cleve's acids) and subsequent hydrolysis. The said para-amido-azo compound is treated with one molecule of nitrous acid, preferably not above 5° C., at which temperature the amido group of the benzene nucleus only is attacked. The formed diazo compound is then combined with one molecule of amido-naphthol-mono-sulfo acid (2.8.6) (G acid) in alkaline solution. When the combination is complete the intermediate dyestuff is further diazotized with one molecule of nitrous acid and combined with one molecule of chlor-meta-phenylene-diamin. The chlor-meta-phenylene-diamin is prepared by reducing in the ordinary way dinitro-chlor benzol.

To enable our invention to be fully understood, we will give an example of the manufacture of black coloring matters in accordance therewith. 7.28 kilos of sodium salt of para-amido-benzene-azo-alpha-naphthylamin-sulfo-acid 1-6 or 1-7 are dissolved and the solution carefully precipitated with 5.2 kilos HCl at a temperature between 0° and 5° C. At this temperature there is run in slowly a solution of 1.4 kilos nitrite of soda. The agitator is then allowed to run until a test shows only a trace of free nitrous acid. The thus produced amido-diazo compound is run into a cold solution of 5 kilos amido-naphthol-sulfo-acid (2.8.6.) (G acid) the solution being kept alkaline by means of sodium carbonate or ammonia. As soon as the combination is completed the violet black intermediate compound is further diazotized by means of 1.4 kilos nitrite of soda and 5.2 kilos HCl.

When the mixture shows no trace of nitrous acid, it is run into an alkaline solution containing 2.86 chlor-meta-phenylene-diamin 1:2:4. The coloring matter may be separated by the addition of salt, and by filtering, pressing, and drying.

Having thus described our invention, what we claim as new and desire to secure by Letters Patent is:—

1. A process for manufacturing a dyestuff which consists in combining a diazo compound with one molecule of amido naphthol mono sulfonic acid (2.8.6) (G acid), further diazotizing the intermediate body thus formed, and finally combining it with one molecule of chlor meta phenylene diamin 1:2:4 in alkaline solution.

2. A process for manufacturing a dyestuff which consists in first treating a para amido azo compound with one molecule of nitrous acid, then combining the diazo compound thus formed with one molecule of amido naphthol mono sulfonic acid (2.8.6) (G acid), further diazotizing the intermediate body thus formed, and finally combining it with one molecule of chlor meta phenylene diamin 1:2:4 in alkaline solution.

In testimony whereof we affix our signatures in the presence of two witnesses.

JOSEPH TURNER.
HARRY DEAN.

Witnesses:
  FREDERICK I. BRIGHT,
  THOMAS H. BARRON.